United States Patent
Morel et al.

(10) Patent No.: US 6,882,065 B2
(45) Date of Patent: Apr. 19, 2005

(54) LINEAR MOTOR ASSEMBLY AND METHOD FOR MOUNTING A LINEAR MOTOR ASSEMBLY

(75) Inventors: Jean-Pierre Morel, Les Fourgs (FR); Walter Freund, Montmollin (CH)

(73) Assignee: Etel SA, Môtiers (CH)

(*) Notice: Subject to any disclaimer, the term of this patent is extended or adjusted under 35 U.S.C. 154(b) by 106 days.

(21) Appl. No.: 10/129,282

(22) PCT Filed: Aug. 29, 2001

(86) PCT No.: PCT/EP01/09913
§ 371 (c)(1),
(2), (4) Date: Nov. 18, 2002

(87) PCT Pub. No.: WO02/19496
PCT Pub. Date: Mar. 7, 2002

(65) Prior Publication Data
US 2003/0137199 A1  Jul. 24, 2003

(30) Foreign Application Priority Data
Aug. 31, 2000  (CH) .............................. 1698/00

(51) Int. Cl.[7] .............................................. H02K 41/00
(52) U.S. Cl. ...................................................... 310/12
(58) Field of Search ............................. 310/12, 13, 14

(56) References Cited

U.S. PATENT DOCUMENTS

| | | | |
|---|---|---|---|
| 5,179,304 A | * | 1/1993 | Kenjo et al. .................. 310/12 |
| 5,179,306 A | * | 1/1993 | Nasar ........................... 310/14 |
| 5,749,670 A | * | 5/1998 | Astor ........................... 403/269 |
| 5,952,742 A |   | 9/1999 | Stoiber et al. ................ 310/12 |

FOREIGN PATENT DOCUMENTS

| | | | | |
|---|---|---|---|---|
| DE | 198 53 250 A1 | 5/2000 | .......... H02K/41/02 |
| JP | 63-73865 | 4/1988 | ......... H02K/41/025 |
| JP | 405284721 A | * 10/1992 | .................. 310/42 |
| JP | 410290560 A | * 10/1998 | .......... H02K/41/03 |

OTHER PUBLICATIONS

Abstract of Japanese Reference No. 63–73865 published Apr. 4, 1988, Patent Abstracts of Japan, vol. 12, No. 308 (E–647), Aug. 22, 1988.

* cited by examiner

*Primary Examiner*—Thanh Lam
*Assistant Examiner*—Judson H. Jones
(74) *Attorney, Agent, or Firm*—Brinks Hofer Gilson & Lione

(57) ABSTRACT

The invention relates to a linear motor, in which the permanent magnets (5), the support (1.1, 1.2) for the permanent magnets (5) and the fixing elements (4) of the support (1.1, 1.2) are completely covered. The covering consists of cover strips (7) that are detachably applied next to the permanent magnets (5) in the border region of the support (1.1, 1.2) and that cover the fixing elements (4), in addition to the fixing boreholes (3) of the support (1.1, 1.2). The permanent magnets (5) are covered by a cover plate (10), which lies on top of the cover strips (7).

22 Claims, 5 Drawing Sheets

LINEAR MOTOR ASSEMBLY AND METHOD FOR MOUNTING A LINEAR MOTOR ASSEMBLY

Applicants claim, under 35 U.S.C. §§ 120 and 365, the benefit of priority of the filing date of Aug. 29, 2001 of a Patent Cooperation Treaty patent application, copy attached, Serial Number PCT/EP01/09913, filed on the aforementioned date, the entire contents of which are incorporated herein by reference, wherein Patent Cooperation Treaty patent application Serial Number PCT/EP01/09913 was not published under PCT Article 21(2) in English.

Applicants claim, under 35 U.S.C. § 119, the benefit of priority of the filing date of Aug. 31, 2000 of a Swiss patent application, copy attached, Serial Number 1698/00, filed on the aforementioned date, the entire contents of which are incorporated herein by reference.

BACKGROUND OF THE INVENTION

1. Field of the Invention

The present invention relates to a linear motor assembly and to a method for mounting this assembly.

2. Description of the Related Art

A linear motor is employed as the drive mechanism in various fields, for example in machine tools, automatic fitting or bonding devices and conveying installations.

A linear motor includes an assembly with a support, to which several permanent magnets are attached in the drive direction and define a track for a runner which can be moved in relation to it. This assembly is also called a secondary element. The runner acts in a reciprocating manner with the magnets and translates this reciprocal action into a translatory motion.

In the course of operating the linear motor it is possible for foreign objects, such as chips or tool elements to be introduced between the runner and the permanent magnets and to become stuck there. If the assembly includes several lined-up supports, these foreign objects can also become stuck at the gaps between joints of the supports. To prevent such sticking, it has already been proposed in accordance with DE 198 53 250 to cover the permanent magnets by a magnetic cover plate, and to pour synthetic resin into the sides of the permanent magnets.

Drill holes are provided in the support and in the synthetic resin material for mounting this assembly. This has the disadvantage that foreign objects can become stuck in these holes.

SUMMARY AND OBJECTS OF THE INVENTION

It is therefore an object of the present invention to embody an assembly of a linear motor consisting of a support and several permanent magnets in such a way that a dependable operation is assured and a simple manufacture is made possible.

This object is attained by a linear motor assembly including a permanent magnet on a support, a fastening element that fastens the support on a machine element, a cover that covers the permanent magnet and a cover element with which the fastening element is covered.

It is a further object of the present invention to disclose a method for mounting an assembly of a linear motor, by which the assembly can be fastened on a machine element in a simple manner, and fastening takes place in such a way that the fastening does not interfere with the operation of the linear motor.

This object is attained by a method for mounting an assembly of a linear motor on a machine element by fastening a support with a plurality of permanent magnets on a machine element via one or more fastening elements, placing a cover element on the support, wherein the cover element covers one of the one or more of the fastening elements and covering the plurality of permanent magnets by a covering tape.

The present invention will be explained by exemplary embodiments.

DESCRIPTION OF THE PREFERRED EMBODIMENT(S) OF THE INVENTION

Figure 1:
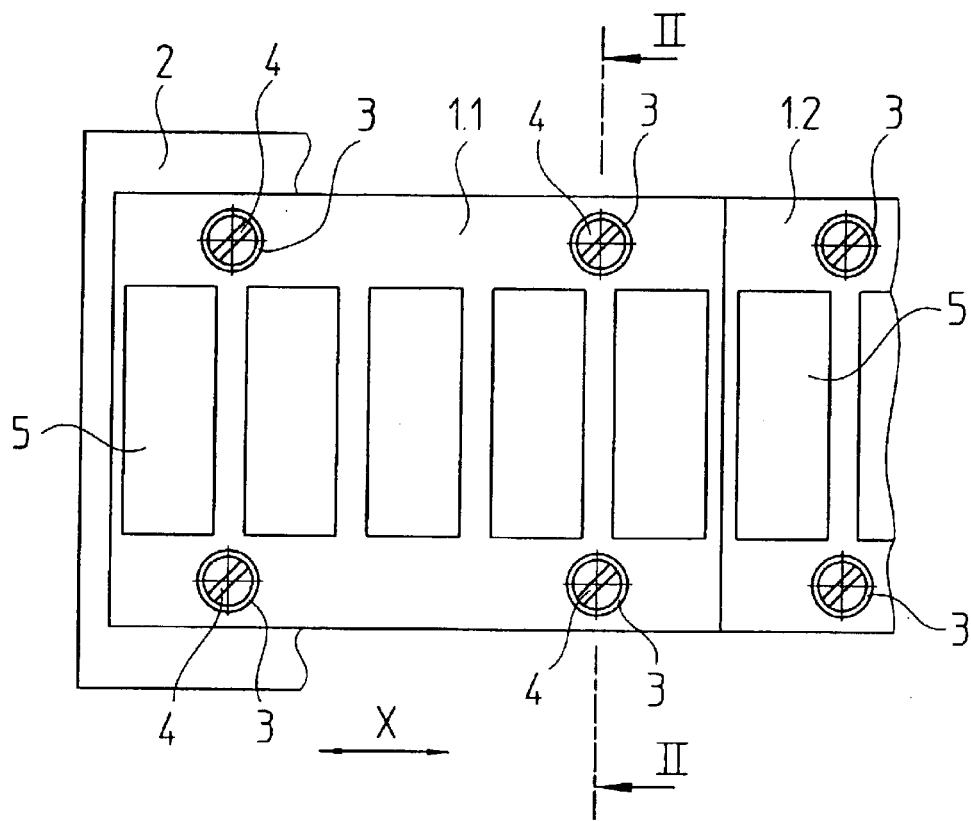
FIG. 1 shows a view from above of an embodiment of an assembly with several supports in accordance with the present invention.

A view from above on an assembly, also called a secondary element, of a linear motor is represented in FIG. 1. This assembly includes several supports 1.1, 1.2, which can be mounted in a row on a machine element 2. As a rule, the supports 1.1, 1.2 include a ferromagnetic material. Each support 1.1, 1.2 has a plurality of bores 3, which are spaced apart from each other and which are engaged by screws 4 for fixing the supports 1.1, 1.2 in place on the machine element 2. Several permanent magnets 5 are arranged one behind the other on the supports 1.1, 1.2 and act reciprocally with a runner 6, only schematically represented in FIG. 2, and cause a movement of the runner 6 in relation to the supports 1.1, 1.2 in the displacement direction X.

Figure 2:
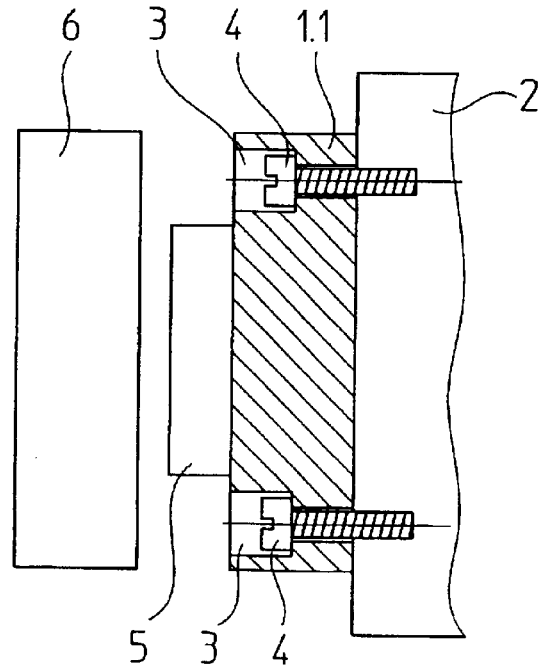
FIG. 2 shows a cross-sectional view of the assembly of FIG. 1 taken along line II—II of FIG. 1.

A cross section II—II in accordance with FIG. 1 is represented in FIG. 2. It can be seen that the bores 3 have been cut so deeply into the supports 1.1, 1.2 that, following the screwing into place of the supports 1.1, 1.2 on the machine element 2 (first mounting step), the heads of the screws 4 have been completely received in the bore 3.

Figure 3:
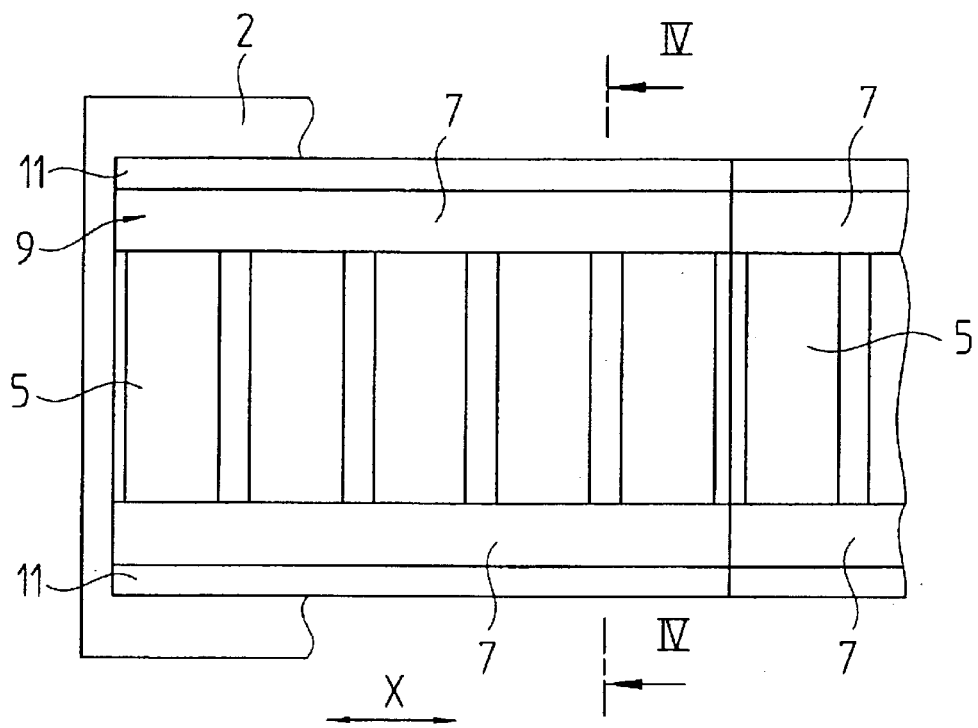
FIG. 3 shows a view from above of the assembly of FIG. 1 with the supports with cover strips in accordance with the present invention.
Figure 4:
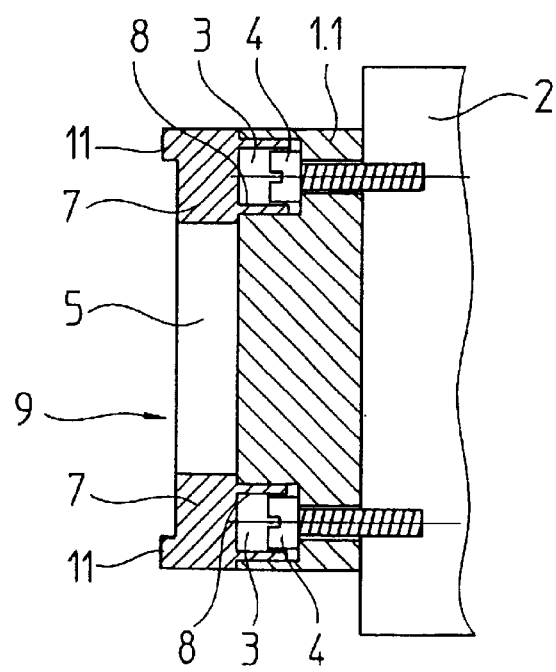
FIG. 4 shows a cross-sectional view of the assembly of FIG. 3 taken along line IV—IV of FIG. 3.

Following the mounting step represented in FIGS. 1 and 2—fastening the supports 1.1 and 1.2 on the machine element 2—a second mounting step takes place, which is represented in FIGS. 3 and 4.

Figure 7:
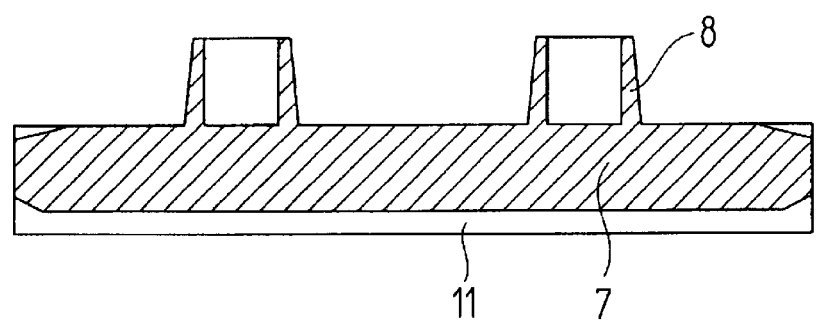
FIG. 7 shows a longitudinal sectional view through an embodiment of a cover strip to be used with the assembly of FIGS. 1–6.

In this second mounting step a cover strip 7 is fastened on the edge areas of the supports 1.1 and 1.2, which respectively extend in the displacement direction X (track of the runner 6). Such a cover strip 7 is schematically shown enlarged in FIG. 7. It is made of a non-magnetic material, in particular plastic (injection-molded element) and has protrusions 8, with which it is wedged into the bores 3 on the support 1.1, 1.2.

The outer diameter of the protrusions 8 constituting the clamping elements corresponds to the inner diameter of the bores 3, so that the bores 3 constitute a fit at the joints for the protrusions 8. By providing several—in particular two— protrusions 8 spaced apart from each other in the displacement direction X, each cover strip 7 is automatically aligned when being pressed on its support 1.1, 1.2. In view of the mechanics of manufacturing it is particularly advantageous if the clamping elements, or protrusions 8, are formed in one piece with the cover strip 7.

Figure 5:
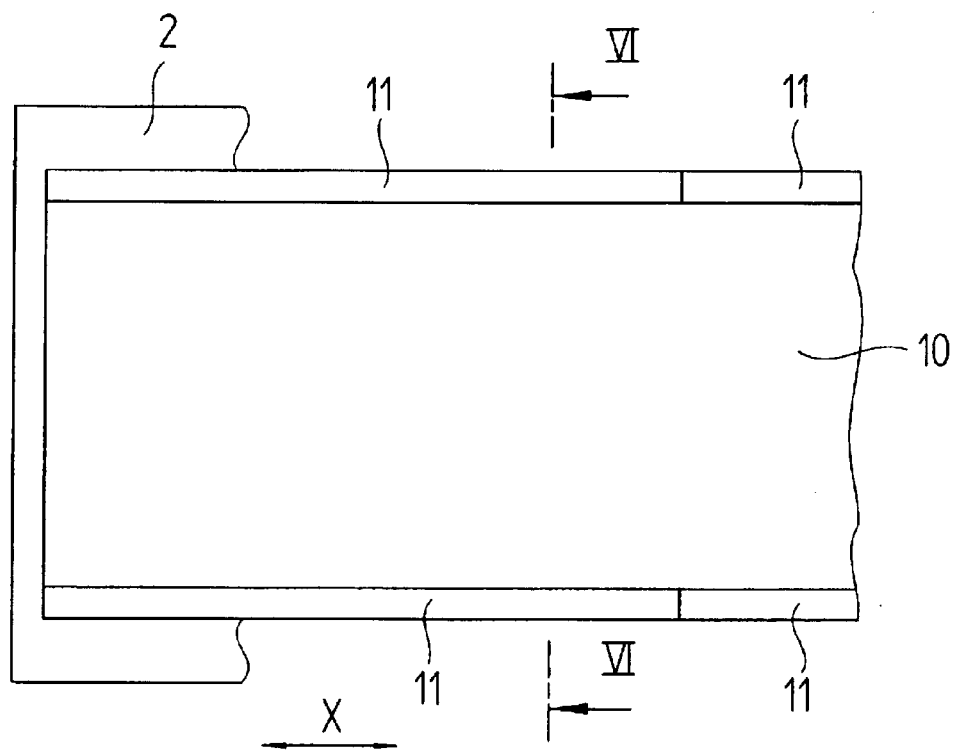
FIG. 5 shows a view from above of the assembly of FIG. 1 with the supports in the completely covered state in accordance with the present invention.
Figure 6:
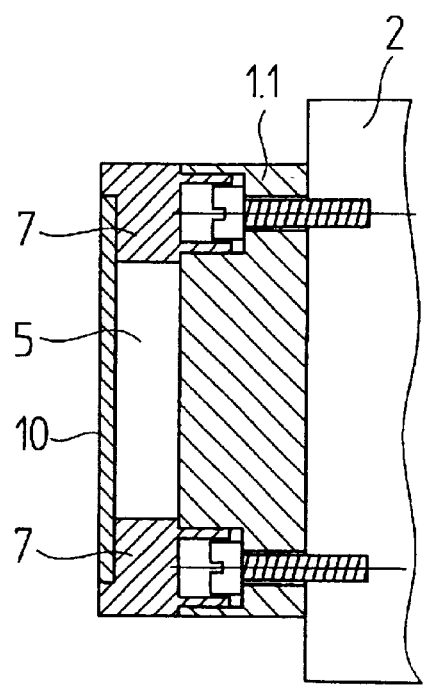
FIG. 6 shows a cross-sectional view of the assembly of FIG. 5 taken along line VI—VI of FIG. 5.

It is particularly advantageous if the cover strips 7 form a conduit 9, which is used for receiving a covering tape 10, which is to be attached in a third mounting step. So that the covering tape 10 rests solidly, the height of the cover strips 7 in the resting area of the covering tape 10 corresponds to the height of the permanent magnets 5. For forming the conduit 9, by which the covering tape 10 is aligned, the cover strips 7 each have a lateral strip 11, whose height corresponds to the thickness of the covering tape 10. The assembly which is completely mounted in this way is represented in FIGS. 5 and 6.

If the covering tape is a sheet metal piece of a ferromagnetic material, for example special steel, no additional steps for fixing the covering tape 10 in place are necessary, since it automatically adheres to the permanent magnets 5 by the magnetic force. The cover plate 10 is preferably inserted continuously into the conduits of the supports 1.1 and 1.2, which are lined up with each other in the displacement direction X, for example by being pulled off a roll.

A cover 7 and 10 for the bores 3, the screws 4 and the permanent magnets 5 is created in this way in a simple manner. The individual elements of this cover in the form of cover strips 7 and the covering tape 10 can be provided to the user of the linear motor, who only inserts them when the supports 1.1, 1.2 are mounted on a machine element. Easy mounting and also removal is possible. The cover strips 7 can be lined up at any arbitrary length as a function of the number of supports 1.1, 1.2 to be mounted.

The surface of the supports 1.1, 1.2 pointing in the direction of the runner 6 is completely covered and level, so that entering foreign objects no longer have a chance of getting stuck. Thus, the operational dependability of the linear motor is assured.

The present invention is explained by the example of two supports 1.1 and 1.2, however, it can also be successfully employed with only one support, or with more than two supports.

Figure 8:
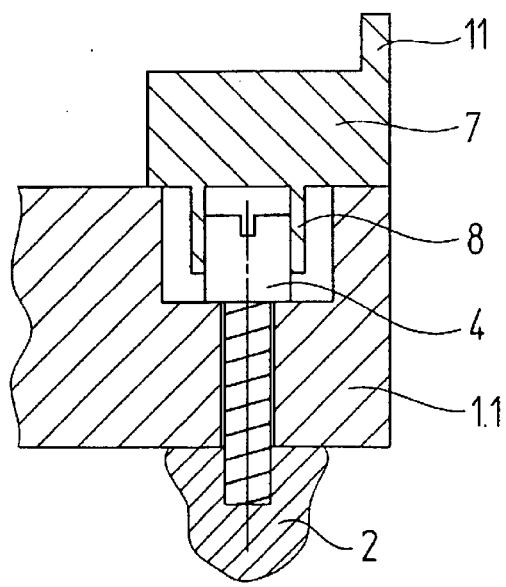
FIG. 8 shows a second fastening option for the cover strip of FIG. 7.
Figure 9:
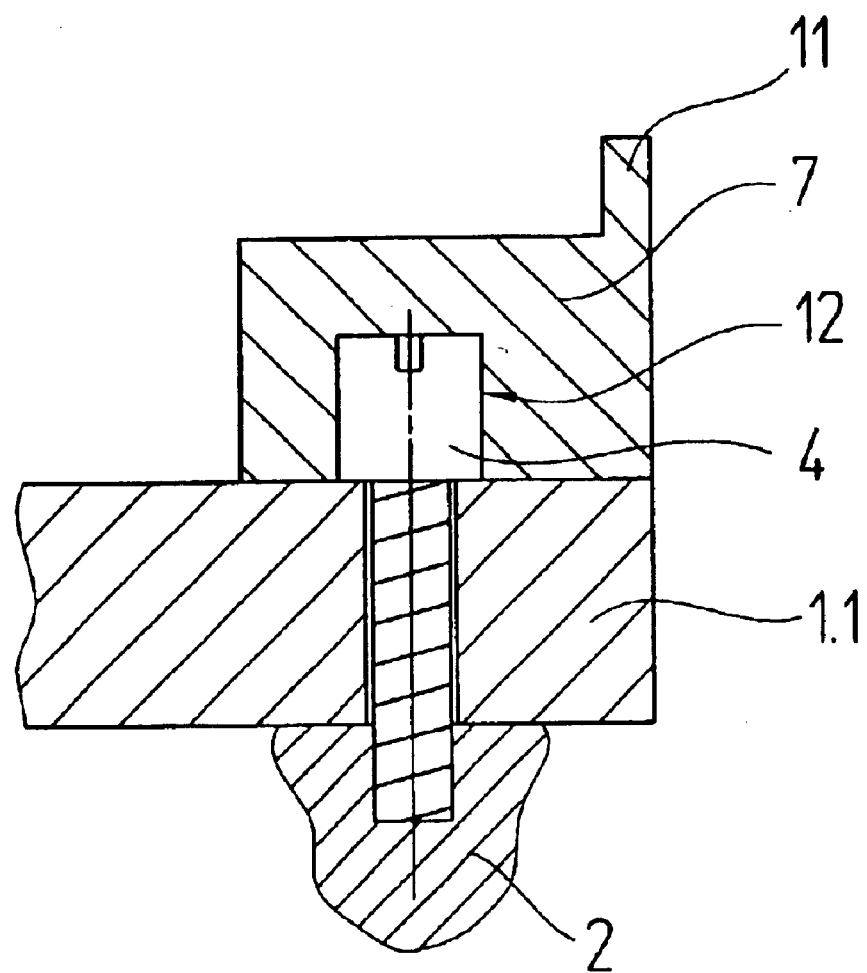
FIG. 9 shows a third fastening option for the cover strip of FIG. 7.

As represented in FIG. 8, the cover strip 7 can also be fixed in place at the outer circumference of the screw 4. In this case no bore 3 need to be provided for receiving the head of the screw 4, as schematically represented in FIG. 9. In place of a protrusion 8, a recess 12 is provided in the cover strip 7 for clamping, which grippingly encloses the head of the screw 4.

In the above explained example, the length of a cover strip 7 is matched to the length of the supports 1.1, 1.2 in that the length of a cover strip 7 corresponds to the length of a support 1.1, 1.2. However, a cover strip 7 can also be selected to be longer, in particular extend over several supports 1.1, 1.2. It can also be advantageous if the cover strip 7 consists of a bendably elastic material—in particular plastic—, so that the cover strip 7 can be rolled up, the same as the covering tape 10, and covers a multitude of fastening elements in one piece by being unrolled. In this case being capable of being rolled up means that the elasticity of the material has been selected to be such that a bending radius of approximately 30 cm is possible, so that when rolled up, great lengths of the cover strip 7 can still be manipulated.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A linear motor assembly comprising:
   a permanent magnet on a support;
   a fastening element that fastens said support on a machine element;
   a cover that covers said permanent magnet; and
   a cover element with which said fastening element is covered.

2. The linear motor assembly in accordance with claim 1, wherein said cover element is a cover strip, which is releasably fastened on said support next to said permanent magnet.

3. The linear motor assembly in accordance with claim 2, further comprising a clamping element formed on said cover strip which is clamped on a corresponding fitting of said support.

4. The linear motor assembly in accordance with claim 2, further comprising a clamping element formed on said cover strip which is clamped on a corresponding fitting of said fastening element.

5. The linear motor assembly in accordance with claim 3, further comprising a second clamping element that is spaced apart from said clamping element, said clamping element and said second clamping element are formed on said cover strip in a direction of a track or a runner, each of said clamping element and said second clamping element is clamped to a corresponding fitting of said support.

6. The linear motor assembly in accordance with claim 4, further comprising a second clamping element that is spaced apart from said clamping element, said clamping element and said second clamping element are formed on said cover strip in a direction of a track or a runner, each of said clamping element and said second clamping element is clamped to a corresponding fitting of said fastening element.

7. The linear motor assembly in accordance with claim 3, wherein said cover strip comprises at least one protrusion constituting said clamping element, which engages a corresponding recess in said support and in this way clamps said cover strip to said support.

8. The linear motor assembly in accordance with claim 4, wherein said cover strip comprises at least one protrusion constituting said clamping element, which engages a corresponding recess in said support and in this way clamps said cover strip to said support.

9. The linear motor assembly in accordance with claim 5, wherein said cover strip comprises protrusions constituting said clamping element and said second clamping element, which engages a corresponding recess in said support and in this way clamps said cover strip to said support.

10. The linear motor assembly in accordance with claim 6, wherein said cover strip comprises protrusions constituting said clamping element and said second clamping element, which engages a corresponding recess in said support and in this way clamps said cover strip to said support.

11. The linear motor assembly in accordance with claim 7 wherein said fastening element comprises a screw and a respective recess, which is clampingly engaged by said at least one protrusion, is provided for receiving said screw on said support.

12. The linear motor assembly in accordance with claim 8 wherein said fastening element comprises a screw and a respective recess, which is clampingly engaged by said at least one protrusion, is provided for receiving said screw on said support.

13. The linear motor assembly in accordance with claim 9 wherein said fastening element comprises a screw and a respective recess, which is clampingly engaged by one of said protrusion, is provided for receiving said screw on said support.

14. The linear motor assembly in accordance with claim 10 wherein said fastening element comprises a screw and a respective recess, which is clampingly engaged by one of said protrusions, is provided for receiving said screw on said support.

15. The linear motor assembly in accordance with claim 2, wherein said cover strip extends in a direction of a track of a runner and said cover strip is fastened in an edge area of said support.

16. The linear motor assembly in accordance with claim 15, wherein said permanent magnet is covered by a covering tape, which partially rests on said cover strip, wherein said cover strip has a height in a resting area which corresponds to the height of said permanent magnet, and outside of said resting area said cover strip has a height corresponding to said height of said permanent magnet plus the thickness of said covering tape.

17. The linear motor assembly in accordance with claim 16, wherein said covering tape is a sheet metal plate made of ferromagnetic material.

18. The linear motor assembly in accordance with claim 16, further comprising a second support and a second cover strip lined up with said second support, wherein said covering tape extends uninterrupted over said support and said second support.

19. The linear motor assembly in accordance with claim 17, further comprising a second support and a second cover strip lined up with said second support, wherein said covering tape extends uninterrupted over said support and said second support.

20. The linear motor assembly in accordance with claims 2, wherein said cover strip is a bendably elastic and can be rolled up.

21. A method for mounting an assembly of a linear motor on a machine element, the method comprising:

fastening a support with a plurality of permanent magnets on a machine element via one or more fastening elements;

placing a cover element on said support, wherein said cover element covers one of said one or more of said fastening elements; and covering said plurality of permanent magnets by a covering tape.

22. The method in a accordance with claim 21, wherein said cover element comprises a cover strip, which is releasably clamped to said support.

* * * * *